(12) United States Patent
Vannan et al.

(10) Patent No.: US 6,336,488 B1
(45) Date of Patent: *Jan. 8, 2002

(54) UNVULCANIZED NONCORD REINFORCED SUBASSEMBLY FOR INCORPORATION IN A TIRE CASING

(75) Inventors: Frederick Forbes Vannan, Clinton; Williams James Head, Ravenna, both of OH (US)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 08/573,341

(22) Filed: Dec. 15, 1995

(51) Int. Cl.⁷ .................................................. B60C 9/02
(52) U.S. Cl. ...................... 152/510; 152/543; 152/548
(58) Field of Search ................................ 152/548, 510, 152/524, 526, 543, DIG. 12, DIG. 16, 450; 156/116, 111, 110.1, 123, 405.1, 406.4, 130, 130.7, 133, 134

(56) References Cited

U.S. PATENT DOCUMENTS

| | | | |
|---|---|---|---|
| 1,320,121 A | 10/1919 | Brucker | |
| 1,353,934 A | 9/1920 | Morris | |
| 1,667,009 A | 4/1928 | Matthias | |
| 1,730,307 A | 10/1929 | Stevens | |
| 1,770,895 A | 7/1930 | Abbott, Jr. | |
| 2,724,423 A | 11/1955 | Harris | 154/1 |
| 2,754,887 A | 7/1956 | Wykoff | 154/14 |
| 3,027,289 A | 3/1962 | Gitzinger | 156/132 |
| 3,237,673 A | 3/1966 | Ward | 152/354 |
| 3,504,710 A | 4/1970 | Pancoast | 138/170 |
| 3,509,929 A | 5/1970 | Delobelle | 152/354 |
| 4,232,723 A | 11/1980 | Gazuit | 152/350 |
| 4,334,448 A | 6/1982 | Messerschmitt | 83/171 |

(List continued on next page.)

FOREIGN PATENT DOCUMENTS

| | | | |
|---|---|---|---|
| DE | 41755 | 7/1962 | |
| DE | 3444612 | 12/1986 | |
| DE | 3724784 | 2/1989 | |
| EP | 0246497 | 11/1987 | |
| EP | 0737564 | 12/1995 | |
| EP | 0701887 | 3/1996 | |
| FR | 865603 | * 5/1941 | 156/397 |
| GB | 580838 | 9/1946 | |
| JP | 59195406 | 11/1984 | |
| JP | 5221204 | 8/1993 | |

*Primary Examiner*—Geoffrey L. Knable
(74) *Attorney, Agent, or Firm*—David L King

(57) ABSTRACT

A tire casing, has an unvulcanized noncord reinforced subassembly 10A as an intermediate article of manufacture. The subassembly 10 has at least two components laminated to it. The components are selected from one or more of the component types consisting of a liner 50, sidewall 70, a chafer 60, a whitewall strip 80, a cover strip 90, and a gum shoulder strip 40. The subassembly 10A has a width (W) and a pair of ends 12,14, the distance between the ends 12,14 defining the subassembly length (L). Preferably, the components are laminated to one another and have common ends 12,14 that are spliced along a substantially flat plane (P). The flat plane (P) extends through the article across its axial width, preferably substantially perpendicular to the length of the subassembly. The flat plane (P) is inclined at an angle θ, θ being less than 90°, preferably about 80° relative to a radial normal plane (NP) passing through and perpendicular to the subassembly 10A. Each end 12,14 has a plurality of closely spaced ridges 81 and valleys 82 of a depth of less than one half the diameter (d) of the cold wire used to form the undulating substantially flat planar end surfaces 12,14.

5 Claims, 9 Drawing Sheets

U.S. PATENT DOCUMENTS

| | | | |
|---|---|---|---|
| 4,465,536 A | 8/1984 | Makino et al. | 156/133 |
| 4,466,473 A | 8/1984 | Matyja et al. | 152/354 R |
| 4,733,709 A | 3/1988 | Lambillotte et al. | 152/548 |
| 4,768,575 A | 9/1988 | Bruner et al. | 152/552 |
| 4,810,317 A | 3/1989 | Lang | 156/134 |
| 4,877,468 A * | 10/1989 | Siegenthaler | 156/111 |
| 4,946,525 A | 8/1990 | Aupic et al. | 156/134 |
| 5,004,635 A | 4/1991 | Griebling | 428/33 |
| 5,030,079 A | 7/1991 | Benzing, II | 425/140 |
| 5,059,274 A | 10/1991 | Kumagai | 156/406 |
| 5,062,462 A | 11/1991 | Rye et al. | 152/548 |
| 5,273,601 A | 12/1993 | Sergel et al. | 156/133 |
| 5,327,353 A | 7/1994 | Nagano | 364/474.09 |
| 5,328,532 A | 7/1994 | Azuma et al. | 156/134 |
| 5,513,560 A | 5/1996 | Downing et al. | |
| 5,638,732 A * | 6/1997 | Becker et al. | 83/461 |
| 5,762,740 A | 6/1998 | Benzino, II et al. | |

* cited by examiner

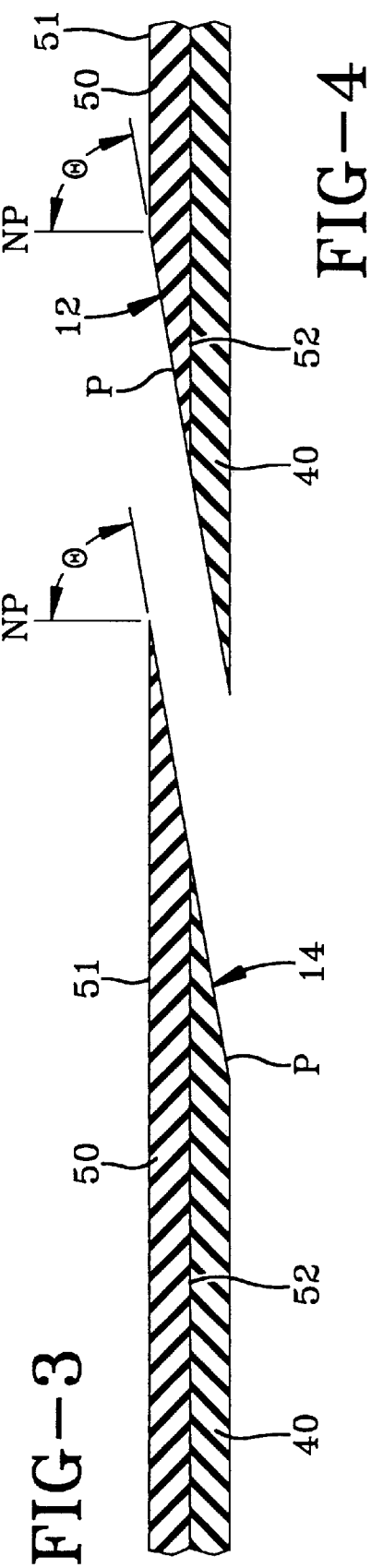

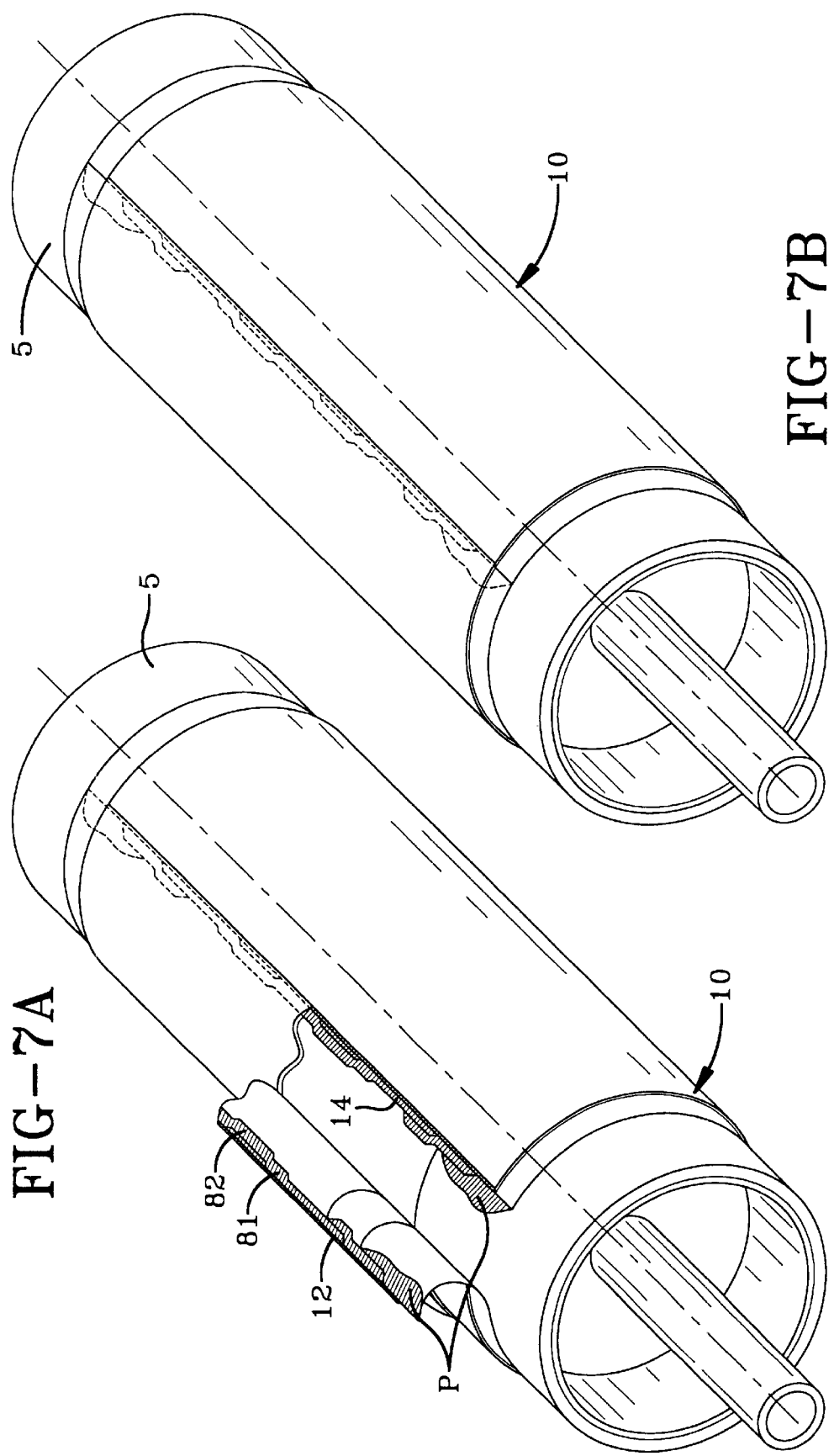

UNVULCANIZED NONCORD REINFORCED SUBASSEMBLY FOR INCORPORATION IN A TIRE CASING

BACKGROUND OF THE INVENTION

This invention relates to a tubeless pneumatic tire and to a cylindrical noncord nonreinforced carcass subassembly 10A for the pneumatic tire as an intermediate article of manufacture. The subassembly 10A in its unvulcanized state is formed into a cylindrical shape at a tire building station and is a subassembly of a pneumatic tire. The invention is described in relation to a radial ply passenger tire, but it is applicable to light truck, medium truck, agricultural, off-road and other radial or bias ply tire constructions.

Historically, the pneumatic tire has been fabricated as a laminate structure of generally toroidal shape having beads, a tread, belt reinforcement and a carcass. The tire is made of rubber, fabric, and steel. The manufacturing technologies employed for the most part involve assembling the many tire components from flat strips or sheets of material. Each component is placed on a building drum and cut to length such that the ends of a component meet or overlap creating a splice.

In the first stage of assembly the carcass would include one or more plies, and a pair of sidewalls, a pair of apexes, an innerliner (for a tubeless tire), a pair of chafers and perhaps a pair of gum shoulder strips. Annular bead cores can be added during this first stage of tire building, and the ply or plies can be turned around the bead cores to form the "ply turnups."

The carcass components (excluding the bead cores) would be either "butt spliced" or "lap spliced." A butt splice has the component ends joined but not overlapped, a lap splice has overlapping ends.

This intermediate article of manufacture would be cylindrically formed at this point in the first stage of assembly. The cylindrical carcass is expanded into a toroidal shape after completion of the first-stage of tire building that results in such cylindrical intermediate article of manufacture. Reinforcing belts and the tread are added to the intermediate article during a second stage of tire manufacture, which can occur using the same building drum or work station or at a separate shaping station.

During the expansion of the carcass, tensile stresses are imposed on the spliced and uncured components of the tire carcass.

In the case of passenger tires, lap splices of the plies were preferred because the splice remained intact whereas butt splices would tend to open or fail. Butt splices were preferred for the commercial or medium truck tires. Even with the good adhesion of the lap splice the cords adjacent the splice tended to be stretched compensating for the overlapped two layers of cords at the splice. This localized stretching creates a nonuniformity that is readily visible under x-ray, ultrasonic display, or by physically cutting the tire and visually inspecting it.

The tire designer, in order to prevent the creation of tire uniformity problems, has historically insured that the splices of the various layers of components were not circumferentially aligned. This nonalignment of splice joints was believed to improve the carcass overall durability and uniformity, as measured by the amount of force variation and the balance of the tire. Tire engineers also have believed that tire uniformity could be improved if these discontinuities were deliberately circumferentially spaced around the carcass.

The subject matter of this patent application completely reverses this conventional wisdom as it relates to unreinforced subassembly construction. The unreinforced subassembly is manufactured with numerous components having a common splice line. The tire casing built with the subassembly according to the present invention can be built more efficiently while reducing splice-related nonuniformities.

SUMMARY OF THE INVENTION

An unvulcanized noncord reinforced subassembly 10 for incorporation in a tire casing as an intermediate article of manufacture, is disclosed. The subassembly has a liner having a pair of lateral ends defining the axial width ($W_L$) of the liner and a plurality of elastomeric components attached to the liner or another of the elastomeric components. The plurality of elastomeric components includes a pair of chafers, one chafer being attached to and overlapping each of the lateral ends of the liner, a pair of sidewalls, each sidewall having a non-linear contoured profile on one surface, each sidewall being axially spaced from the liner and attached to and overlapping the chafer.

The liner and the elastomeric components have a pair of lateral ends defining the axial width (W) of the casing subassembly. The liner and the elastomeric components each have a predetermined cross-sectional profile having lateral edges at predetermined locations along the length of the casing subassembly. Each component is formed and attached while hot at the location where formed, thereby fixing the location of the lateral edges of each component to form a casing subassembly. The casing subassembly is adapted to be cut to length with common ends being spliced along a substantially flat plane, extending thus through the article across the axial width (W). The formed casing subassembly is adapted to accept a ply and a pair of annular bead cores positioned onto the casing subassembly at a latter stage of building the tire.

The above-described subassembly 10 is cut from a laminate 10A. The laminate 10A has at least two components laminated together, the components being selected from one or more of the component types consisting of a liner 50, a chafer 60, a sidewall 70, a whitewall strip 80, a cover strip 90 and a gum shoulder strip 40. The laminate 10A has a width (W), a pair of ends 12,14, the distance between the ends defining the subassembly length (L). The components have common ends 12,14 spliced along a substantially flat plane (P), the plane (P) extending through the article across its axial width (W). The splice or flat plane (P) is inclined at an angle θ, θ being less than 90° and greater than 60° relative to a normal plane (NP) passing through the laminate and extending. In a preferred embodiment of the invention the splice or flat plane (P) is inclined at an angle θ of about 80°. This orientation of the splice permits the ends 12,14 to have large uncured surface areas which upon assembly greatly increases adhesion of the joint. Ideally for manufacturing efficiency and improved product quality it is preferable that each of the components listed above in the quantities required to assemble the subassembly be spliced along a straight linear surface as described above.

BRIEF DESCRIPTION OF THE DRAWINGS

FIG. 3 is an enlarged transverse view of the subassembly end 14 taken along lines 3—3 of FIG. 2A.

FIG. 4 is an enlarged transverse view of the opposite subassembly end 12 taken along line 4—4 of FIG. 2A.

FIG. 7A and 7B are perspective views of the complete carcass cylindrically formed on a building drum.

DEFINITIONS

Figure 1:
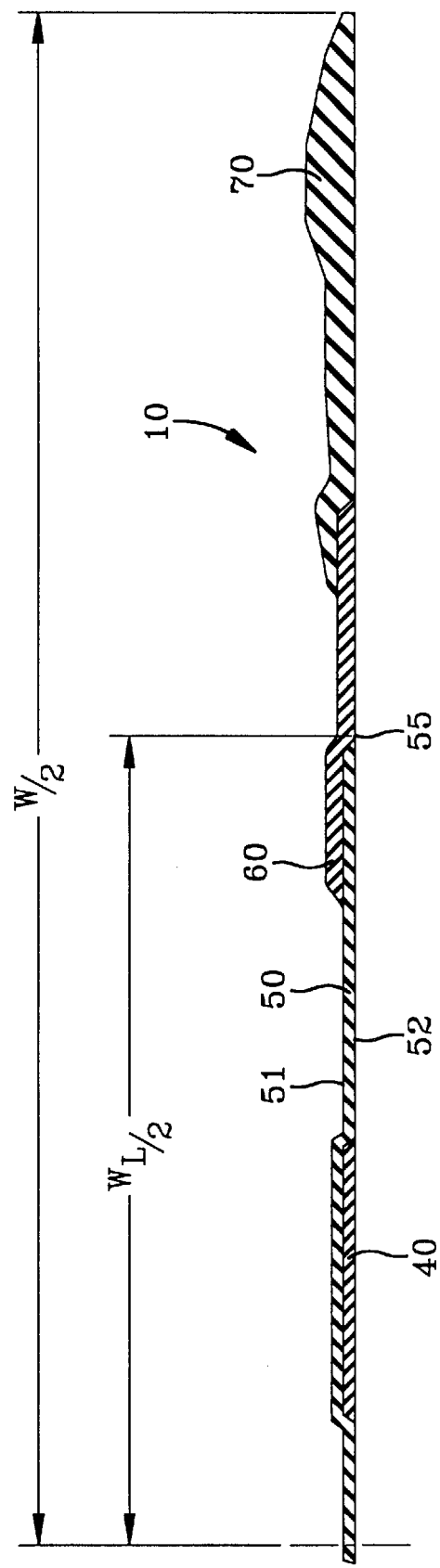
FIG. 1 illustrates one half of the subassembly cross section as taken along lines 1—1 of FIG. 2A prior to being formed cylindrically upon a tire building drum, the building drum not illustrated.

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the carcass, the belt reinforcement and other components of the tire excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement filaments, cables, or strands of which the plies in the tire are comprised.

"Equatorial plane (EP)" means the plane perpendicular to the tire's axis of rotation and passing through the center of its tread.

"Innerliner or liner" means the layer or layers of elastomer or other material that form the inside surface of a tubeless tire and that contain the inflating fluid within the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65° and 90° with respect to the equatorial plane of the tire.

"Section height" means the radial distance from the nominal rim diameter to the outer diameter of the tire at its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Shoulder gum strip" means an elastomeric reinforcement located in the shoulder region of the carcass.

"Sidewall" means that elastomeric portion of a tire between the tread and the bead.

"Subassembly" means an unvulcanized assembly of laminated unreinforced tire components to which a cord reinforced ply or plies and other tire components can be added to form a casing.

"Tread" means a rubber component which when bonded to a tire carcass includes that portion of the tire that come into contact with the road when the tire is normally inflated and under normal load.

"Tread width" means the arc length of the tread surface in the axial direction, that is, in a plane parallel to the axis of rotation of the tire.

DETAILED DESCRIPTION OF THE PREFERRED EMBODIMENT

Referring to FIGS. 1, 2A, 2B and 3 there is illustrated an intermediate article of manufacture made in accordance with the present invention. The intermediate article of manufacture is a subassembly 10 for the casing of a pneumatic tire 100.

FIG. 1 illustrates the intermediate article of manufacture 10, the article being a tire casing subassembly 10. The casing subassembly 10 is a flat laminate composite structure having first and second longitudinal ends and comprising many components. As shown all of the components are either sheets or strips of unreinforced material of substantially the same length. Each component shown is precisely located laterally relative to one another. The method and apparatus 200 for producing and cutting this laminated structure is disclosed in co-pending U.S. patent application Ser. Nos. 08/299,943 and 08/572,929 respectively entitled "METHOD AND APPARATUS FOR CUTTING OF ELASTOMERIC MATERIALS" and "A METHOD AND APPARATUS FOR BUILDING A LAMINATE AND FORMING A SUBASSEMBLY FOR A TIRE FROM UNREINFORCED TIRE COMPONENTS", which is incorporated herein by reference.

Figure 8:
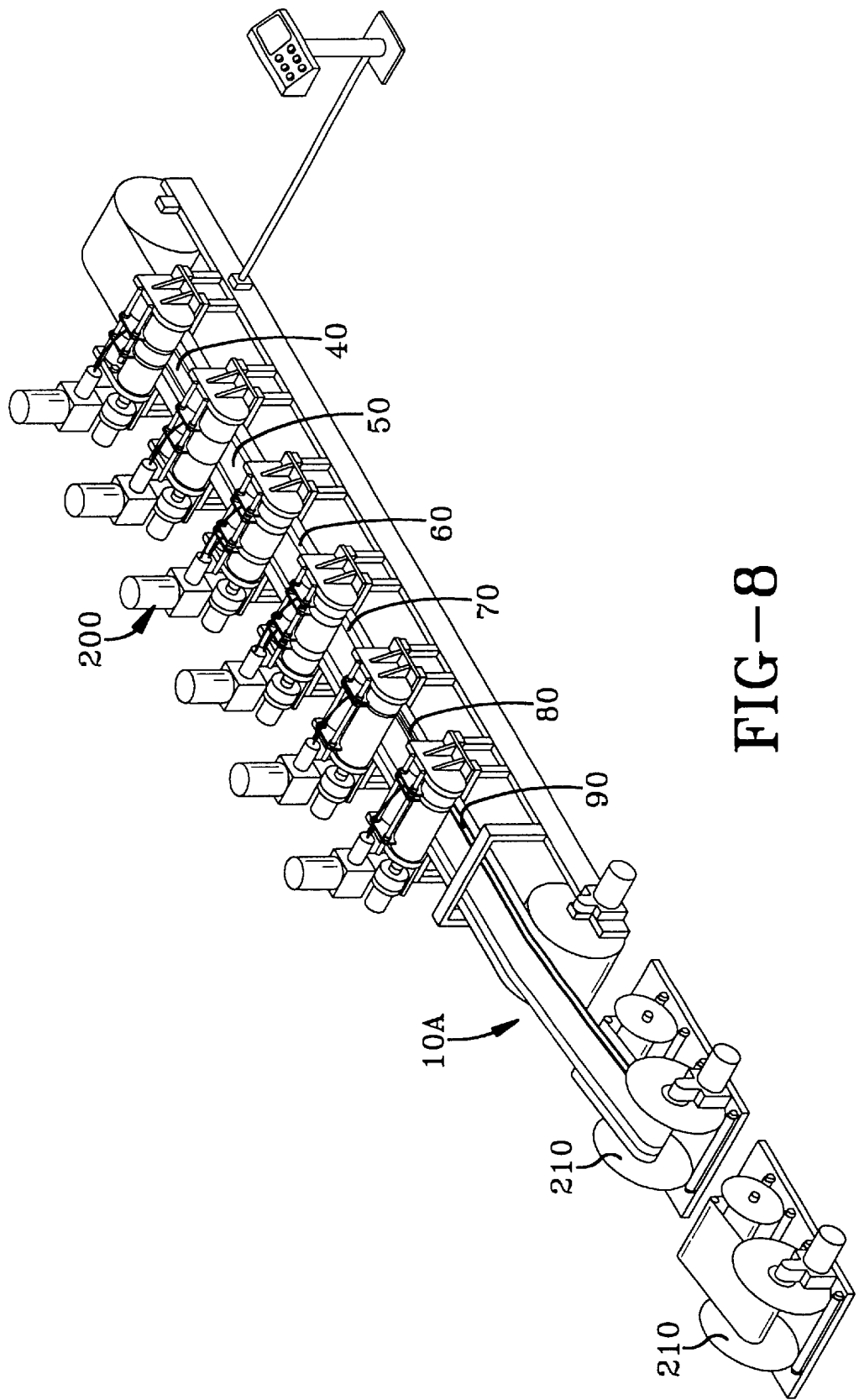
FIG. 8 is an illustration of the apparatus used to form and assemble the subassembly.

The laminate 10A when manufactured by the apparatus 200 as shown in FIG. 8 can be made into continuous rolls 210. The laminate 10A prior to cutting is then, in its preassembled state, preferably stored in large rolls 210 which when sent to a tire building station are cut to a precise length (L) by a unique cutting apparatus. The cut to length subassembly 10 is then formed into a cylindrical shape as described later in this patent application.

FIG. 1 depicts the subassembly 10.

A liner component 50 is attached over the shoulder gum strips 40. The liner 50 creates an air impervious barrier for the radially inner air chamber of the tubeless type tire. The liners are generally comprised of halobutyl rubber. The liner 50 has an axial width ($W_L$) equal to or narrower than overall width (W) of the laminate 10A. The liner width is sufficient to traverse axially outward of the beads when the tire is toroidally shaped, thus forming an air tight chamber between the tire 100 and the wheel upon assembly.

Axially inward of the lateral ends 55 of the liner 50 and attached to a second surface 52 of the liner 50 is a pair of shoulder gum strips 40. The shoulder gum strip acts as a rubber reinforcement in the shoulder portion 27 of the casing subassembly 10.

A chafer component 60 is shown at each lateral end 55 of the liner 50. The chafer 60 is attached to the liner 50, at the first surface 51 and is slightly overlapped by a sidewall component 70. The chafer 60 is positioned axially to provide a tough rubber reinforcement between the tire 100 and the rim flange of the wheel and is accordingly located in the bead region of the finished tire.

A sidewall component 70 is shown attached to the laminate and extends laterally outward of the lateral ends 55 of the liner 50. The sidewalls 70 slightly overlapped the chafers 60.

Optionally, to build an outlined white letter tire or a whitewall tire, a whitewall strip 80 and a cover strip 90 may be added to the laminate 10A as shown in FIG. 8.

Additionally, the subassembly can include any additional component which is not reinforced with a plurality of cords and is used as a component in the casing 10 of a tire.

The above description of the casing subassembly 10 includes all of the elastomeric components required to build the tubeless tire casing subassembly 10 except for the ply or plies, the apex, and the belt reinforcements, and it is considered to be the best mode of practicing the invention because it is a most efficient method to produce such a tire casing subassembly 10.

Additionally, it is considered within the scope of the invention that the intermediate article of manufacture include one liner 50 and at least two of the components selected from the group of components described above, all having the unique common splice feature as described below.

Figure 2A:
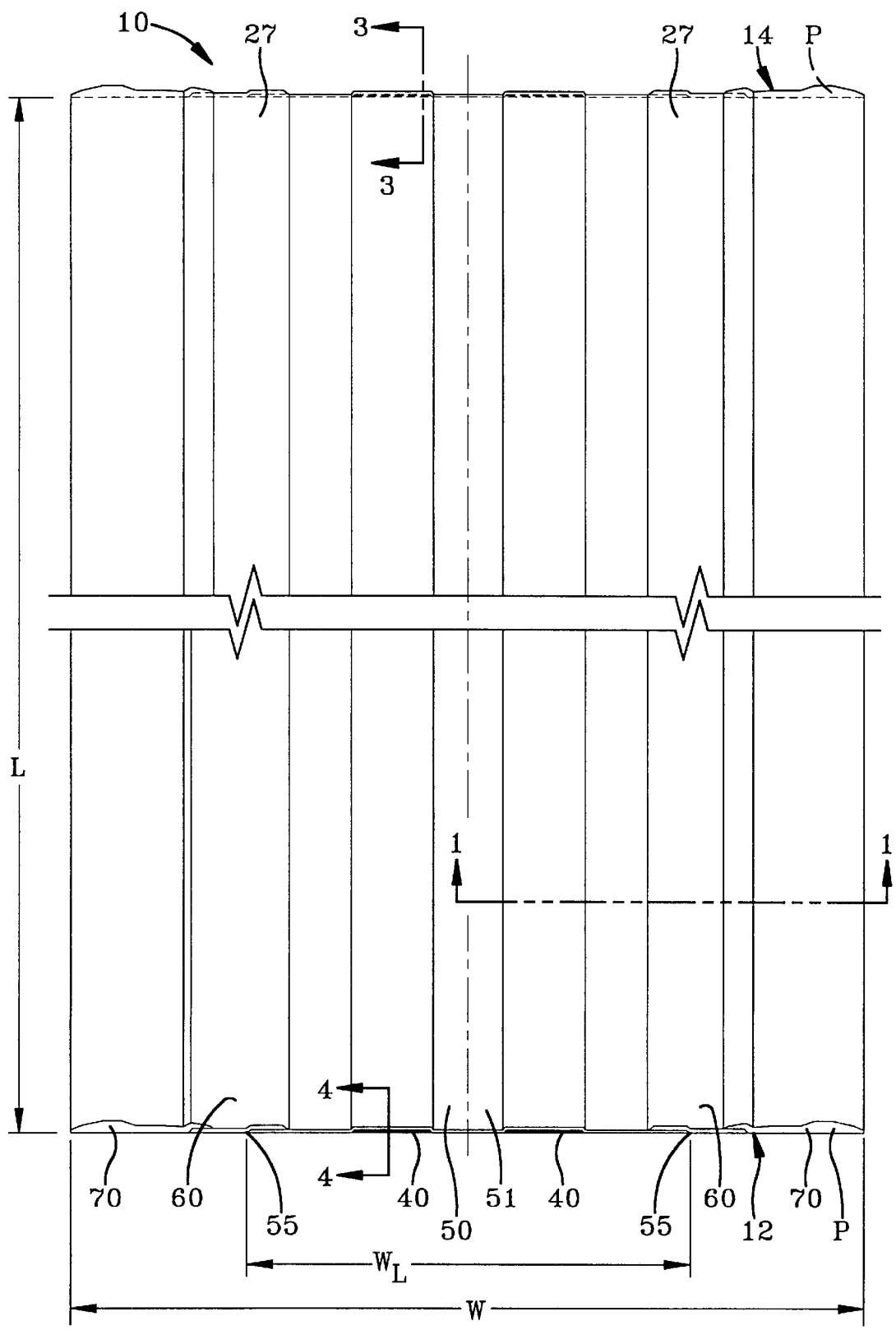
FIG. 2A is a partial plan view of the unreinforced subassembly's inner surface with components attached.
Figure 2B:
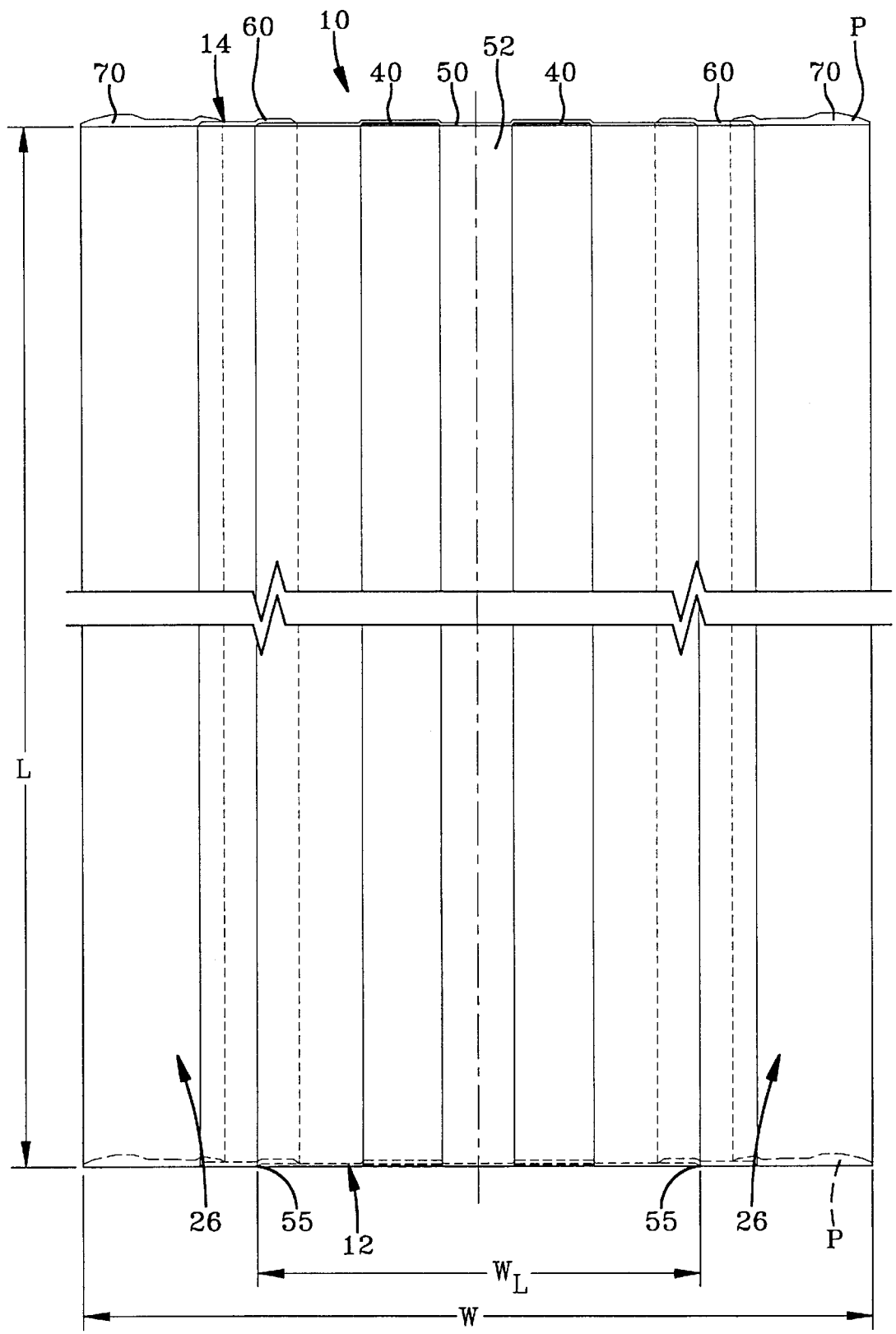
FIG. 2B is a partial plan view of the unreinforced subassembly's outer surface with components attached, both views FIG. 2A and FIG. 2B being slightly inclined to depict the ends 12 and 14.
Figure 5:
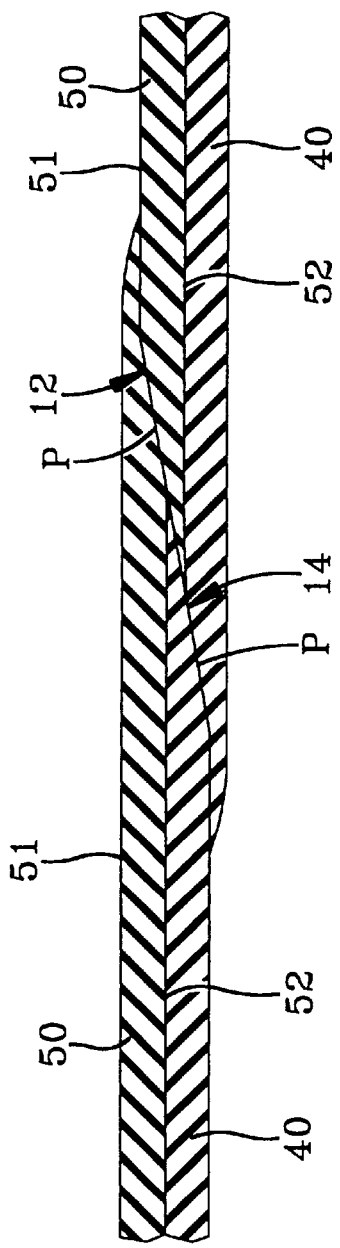
FIG. 5 is a partial view of the carcass depicting the splice joint of the subassembly prior to its being toroidally expanded.

FIGS. 2A and 2B depict the first end 12 and second end 14 respectively of the subassembly 10 as it exists prior to being formed into a cylindrical shape and spliced at its joined ends 12,14. Both ends 12,14 are cut along substantially straight line path. The substantially straight line cutting creates a first end or surface area 12 and a second end or surface area 14. The surface areas 12 and 14 (as may best be seen in FIGS. 3–6) are inclined at an angle θ less than 90° relative to a normal plane (NP), the normal plane (NP) being perpendicular to the laminate 10A. In order to achieve sufficiently large surface areas 12,14 for splicing, it is believed desirable to insure that the angle θ be greater than 60°. In the preferred embodiment the angle θ is about 80°. Some tires have been built having a carcass subassembly cut at an angle θ of 82°. This high angle of inclination provides a large surface area of adhesion when the two ends 12,14 are spliced at the building drum as shown in FIG. 5. As shown in FIG. 7A the cut ends 14,16 exhibit fine ribs or ridges 81 and valleys or grooves 82 which are formed when the laminate 10A is cut. Each ridge 81 or valley 82 has a respective height or depth less than the diameter (d) of the wire used to cut the subassembly preferably about one half (d). The spacing of each ridge and valley closely approximate the wire diameter (d) but can vary based on the cutting traversing speed. These fine undulating surfaces are believed to further enhance the adhesion of the splice.

The cut ends 12,14 were formed by the reciprocating motion of a wire having a diameter (d) sufficiently small to cut the thinnest cross section of the subassembly 10 without buckling the ends of the subassembly 10, preferably the wire has a diameter of less than 0.050 of an inch. In the preferred embodiment the wire diameter was 0.016 of an inch. The wire cuts at a high cyclic rate but substantially slower rates than ultrasonic type cutters. This cutting is done with a cold or room temperature wire. The only heat generated is the frictional heat created during cutting. This cold cutting unlike any hot knife cutting, laser or ultrasonic cutting does not surface precure the material along the flat planar surfaces P. This in combination with the ridges 81 and valleys 82 creates a bonding surface heretofore unachievable particularly at the angular inclination θ, most certainly when θ is set at about 80°. In such cases the alternative cutting techniques tend to push and bunch the material unable to create a flat planar surface cut as described above. For these reasons the subassembly 10 can be any two components laminated together having the common cut ends as disclosed above.

The subassembly 10 is shown in FIG. 7A wrapped about a building drum 5 and a portion of the subassembly is shown prior to being spliced. The subassembly ends 12 and 14 have two inclined substantially flat surfaces lying in planes P. The ends 12 and 14 are spliced together along the plane P as shown in FIG. 7B.

Figure 6:
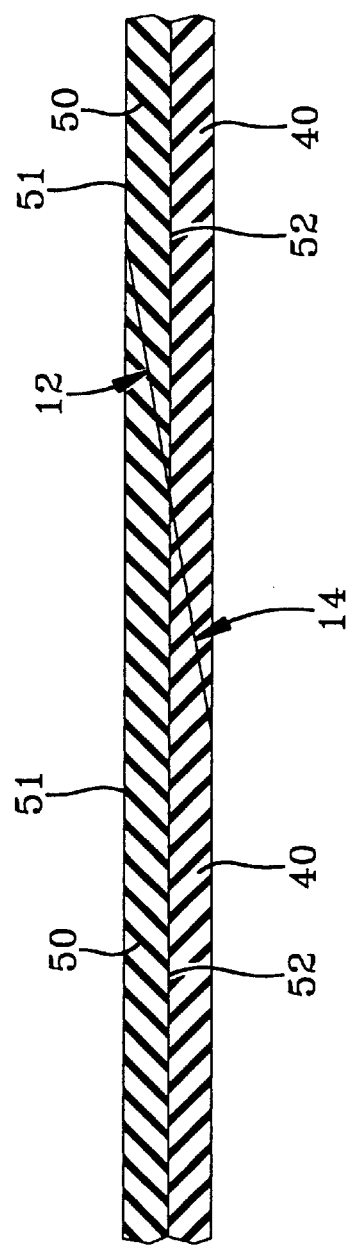
FIG. 6 is a partial view of the subassembly depicting the subassembly splice, after it has been cylindrically formed on a toroidal drum 5.

With reference to FIGS. 5 and 6 the subassembly after being cut to length and wrapped about a cylindrical building drum is spliced. Although the first and second ends have almost identical mating surfaces, it has been empirically discovered that the splice should slightly overlap as shown in the enlarged view of FIG. 6. This feature coupled with the inclined surfaces 12,14 enables the subassembly 10 when expanded to stretch precisely at the splice. The resultant effect is that the overlapping ends 12,14 are pulled back into uniform alignment. After vulcanization, tires made according to the invention have to be x-rayed, ultrasonically inspected or buffed down to the ply cords in an attempt to visually detect the subassembly splice. The splice is virtually not detectable to experienced personnel.

Figure 7C:
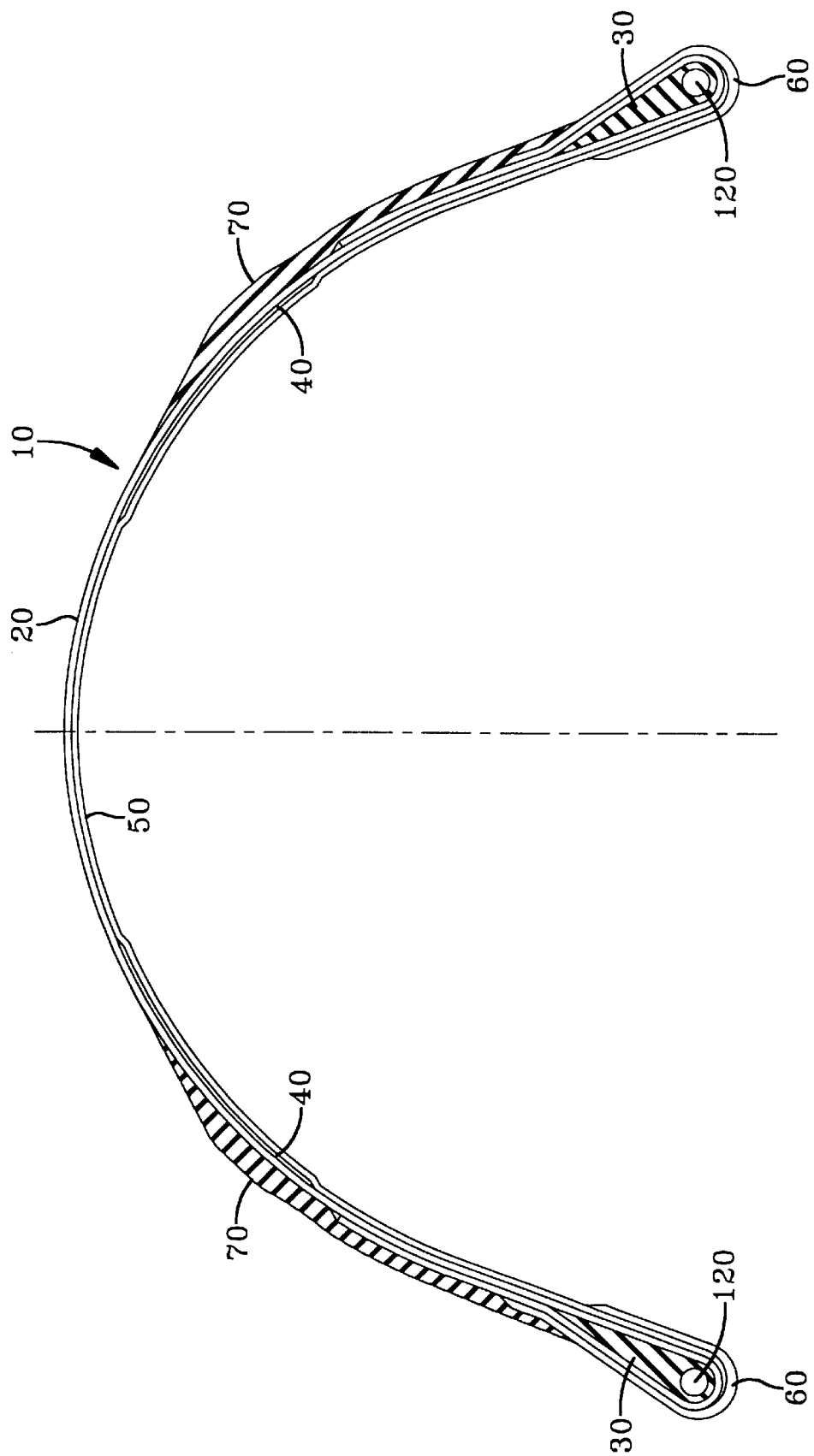
FIG. 7C is a cross-sectional view of the complete carcass after being expanded and toroidally formed.

In FIG. 7C the carcass is shown in a cross-sectional view after being expanded into a toroidal shape. Prior to expanding the carcass, a ply 20, a pair of apexes 30, and a pair of annular beads 120 are positioned onto the cylindrical subassembly, and the turnup ends and sidewalls are rolled over the bead cores and are stitched to the ply 22. The carcass is then expanded into the toroidal shape as illustrated.

Figure 7D:
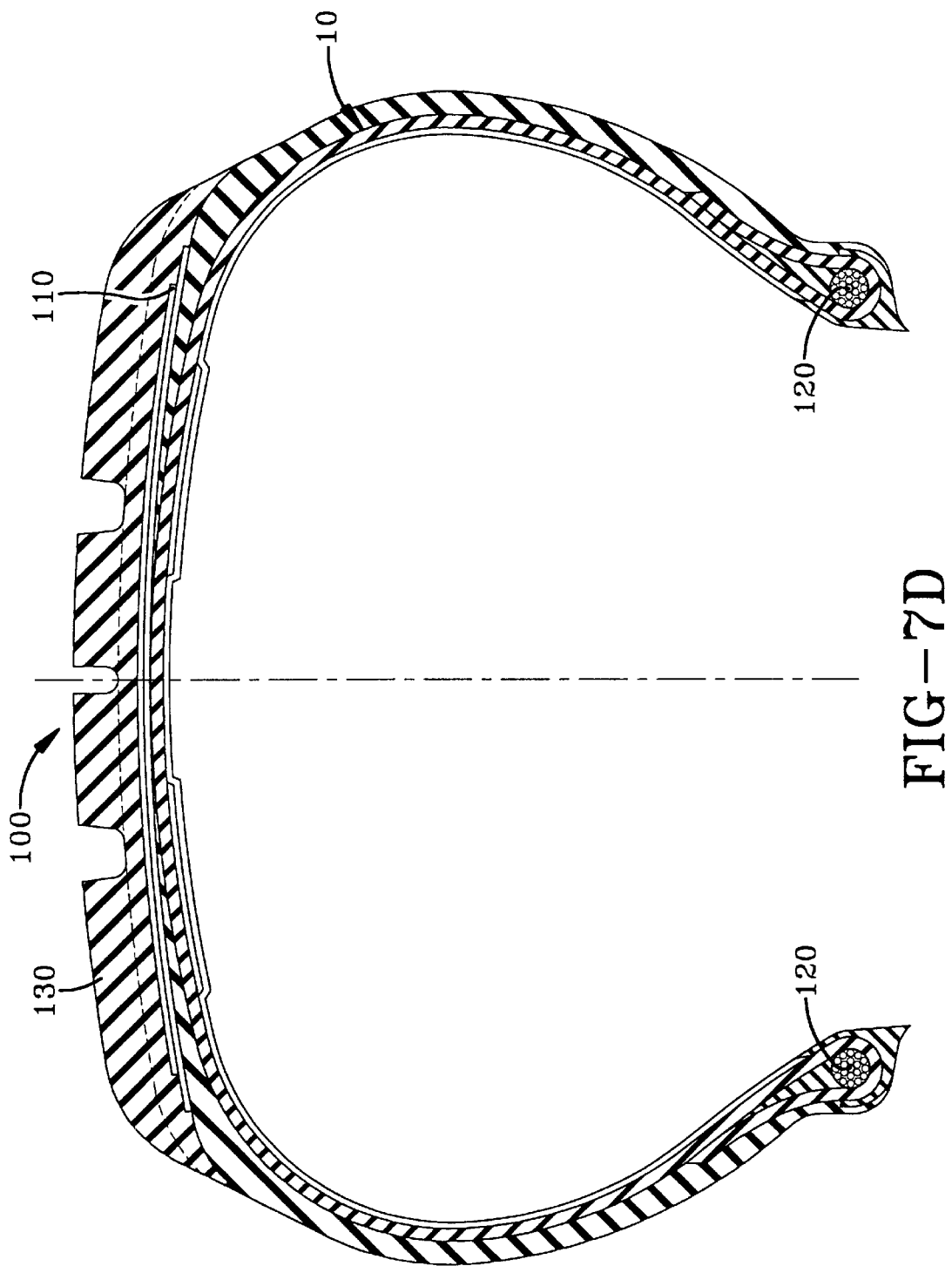
FIG. 7D is a cross-sectional view of a tire made with the subassembly.

In FIG. 7D a finished tire is shown in cross section. The finished tire 100 when assembled and cured will have a carcass, reinforcing belts 110, annular beads 120 and a tread 130. The carcass subassembly 10 will have the common end splice. It is believed desirable when building the finished tire to insure that the subassembly 10, the plies 20, the reinforcing belts 110 and tread 130 have their splices circumferentially spaced at distinct locations about the circumference as is the conventional practice to improve the overall tire balance and uniformity.

The invention described above not only enables tires to be more efficiently manufactured but also enables the tires to exhibit greater uniformity.

The pneumatic tire 100 according to the present invention has a toroidal shape, the tire 100 has a tread 130, at least two belt plies 110 having cord angles oppositely oriented with respect to the equatorial plane of the tire 100. The belt plies are oriented at angles in the range from 17° to 30°. The tire 100 has a subassembly 10 and at least one ply 20 with cords or two or more plies with bias oriented cords and other components, the liner 50 and at least two, preferably all such subassembly components having been spliced along a single surface or plane during construction of the subassembly 10 as an intermediate article of manufacture.

In building tires it has been determined that the cord angles of adjacent plies in multiple ply tire constructions preferably should be oppositely oriented relative to the equatorial plane. For that reason it is believed desirable to assemble additional plies to the tire carcass in a separate step at the tire building station, when a second or more plies are need to manufacture the tire. In many tires particularly steel cord reinforced tires, only one ply 20 is required in the manufacture of the finished tire 100. In those cases, the carcass 10 can be reinforced with the bead cores 120, belts 110 and tread 130 for a complete tire 100.

What is claimed is:

1. An unvulcanized noncord reinforced subassembly for tubeless pneumatic tire casing as an intermediate article of manufacture, the casing subassembly comprising:

a liner having a pair of lateral ends defining the axial width ($W_L$) of the liner;

a plurality of elastomeric components ached to the liner or another of the elastomeric components, the plurality of elastomeric components including a pair of chafers, one chafer being attached to and overlapping each of the lateral ends of the liner, a pair of sidewalls, each sidewall having a non-linear contoured profile on one surface, each sidewall being axially spaced from the liner and attached to and overlapping the chafer; and the liner and the elastomeric components having a pair of lateral ends defining the axial width (W) of the casing subassembly, the liner and the elastomeric component each having a predetermined cross-sectional profile having lateral edges at predetermined locations along the length of the casing subassembly, each component being formed and attached while hot at the location where formed, thereby fixing the location of the lateral edges of each component to form a casing subassembly, the casing subassembly being adapted to be cut to length with common ends being spliced along a substantially flat plane, extending thus through the article across the axial width (W), and the formed casings subassembly adapted to accept a ply and a pair of annular bead cores positioned onto the casing subassembly at a latter stage of building the tire.

2. The unvulcanized noncord reinforced subassembly of claim 1 wherein the plurality of elastomeric components attached to the subassembly further include one or more of the elastomeric components selected from the group of an apex a whitewall strip, a cover strip, a gum shoulder strip and any other elastomeric strip of non-cord reinforced tire component.

3. The unvulcanized noncord reinforced subassembly of claim 1 wherein the common ends exhibit no surface curing when cut.

4. The unvulcanized noncord reinforced subassembly of claim 3 wherein each of the common ends when spliced being along a substantially flat plane, the plane extending through the article across its axial width (W) of an angle θ, θ being less than 90° and greater than 60° relative to a radial plane NP passing across the laminated components width.

5. The unvulcanized noncord reinforced subassembly of claim 4 wherein the angle θ is about 80°.

* * * * *